United States Patent [19]

Pisano

[11] 3,802,650
[45] Apr. 9, 1974

[54] LOCK-AND RELEASE MECHANISM FOR PROPELLANT ACTUATED ESCAPE SYSTEM

[75] Inventor: Frank T. Pisano, Voorhees, N.J.

[73] Assignee: The United States of America as represented by the Secretary of the Air Force, Washington, D.C.

[22] Filed: July 18, 1973

[21] Appl. No.: 380,520

Related U.S. Application Data

[63] Continuation-in-part of Ser. No. 152,841, June 14, 1971, abandoned.

[52] U.S. Cl............................ 244/121, 244/122 AF
[51] Int. Cl............................................... B64c 1/14
[58] Field of Search..................... 244/121, 122 AF; 74/424.8 R, 424.8 A, 424.8 B, 424.8 C, 424.8 VA, 424.8 VZ, 424.8 NA; 92/24, 29; 188/129; 267/9 R, 9 B, 9 C

[56] References Cited
UNITED STATES PATENTS

| 3,559,499 | 2/1971 | Profet | 74/424.8 R |
| 3,229,544 | 1/1966 | Haller | 74/424.8 R |
| 2,703,156 | 3/1955 | Depallens | 188/129 |
| 2,479,713 | 8/1949 | Beach | 244/121 |

Primary Examiner—Duane A. Reger
Assistant Examiner—Randolph A. Reese

[57] ABSTRACT

A pair of concentric tubes with a sliding fit, an outer tube fixed and the inner tube movable, a tang riding on a cam surface and spring loaded, controls a key that securs the two tubes in operative relation, the tangs spring bias allows for a predetermined deflection of the tang before releasing the keys thereby providing a shock absorbing effect.

2 Claims, 4 Drawing Figures

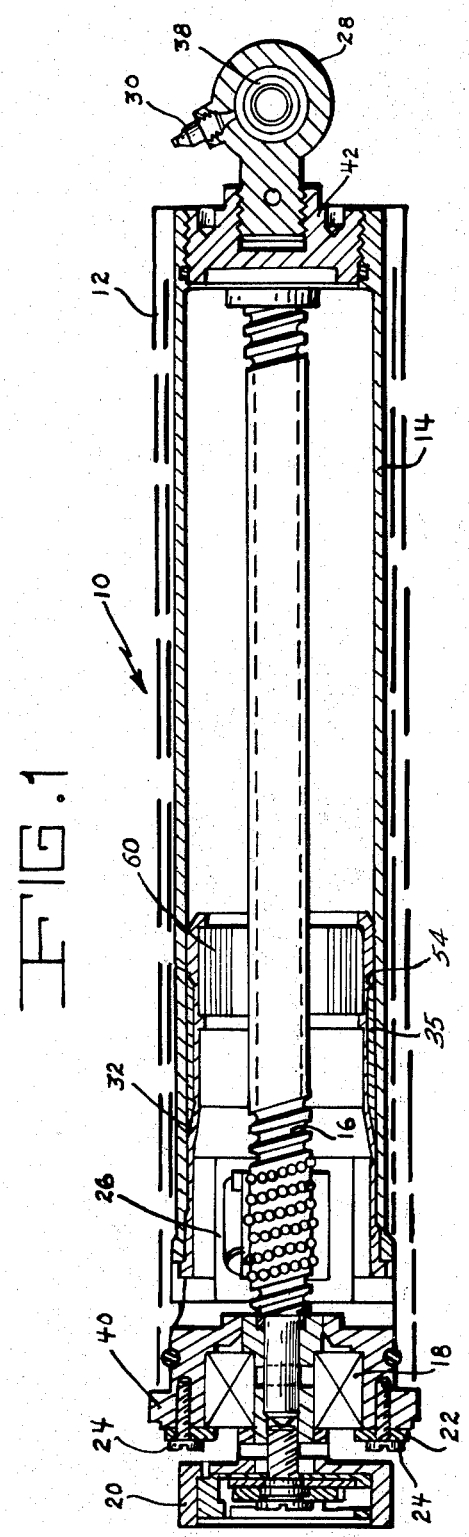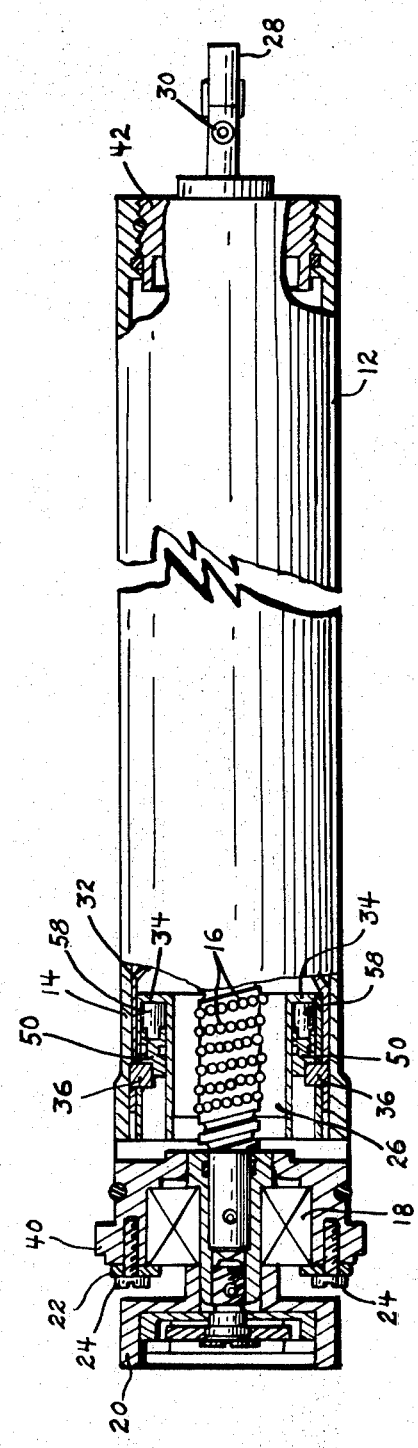

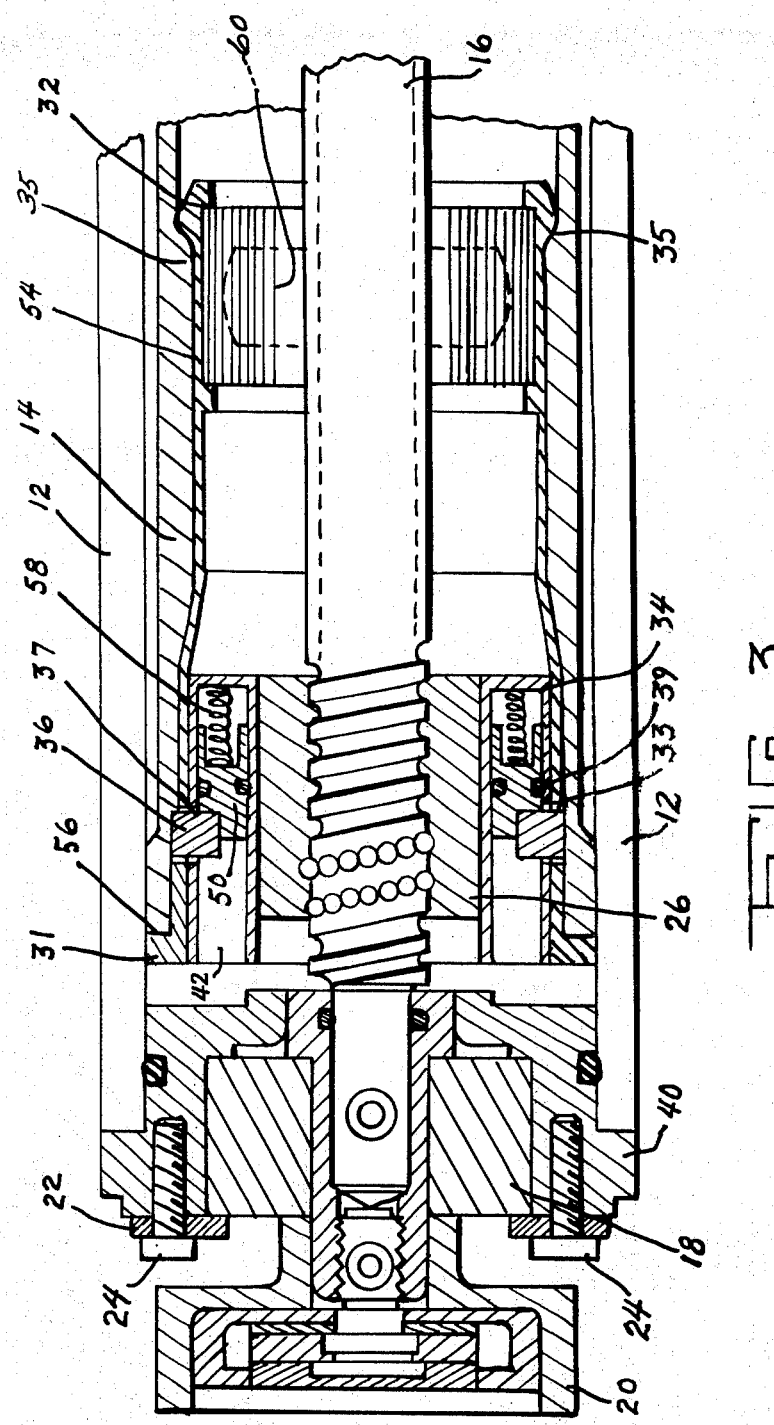

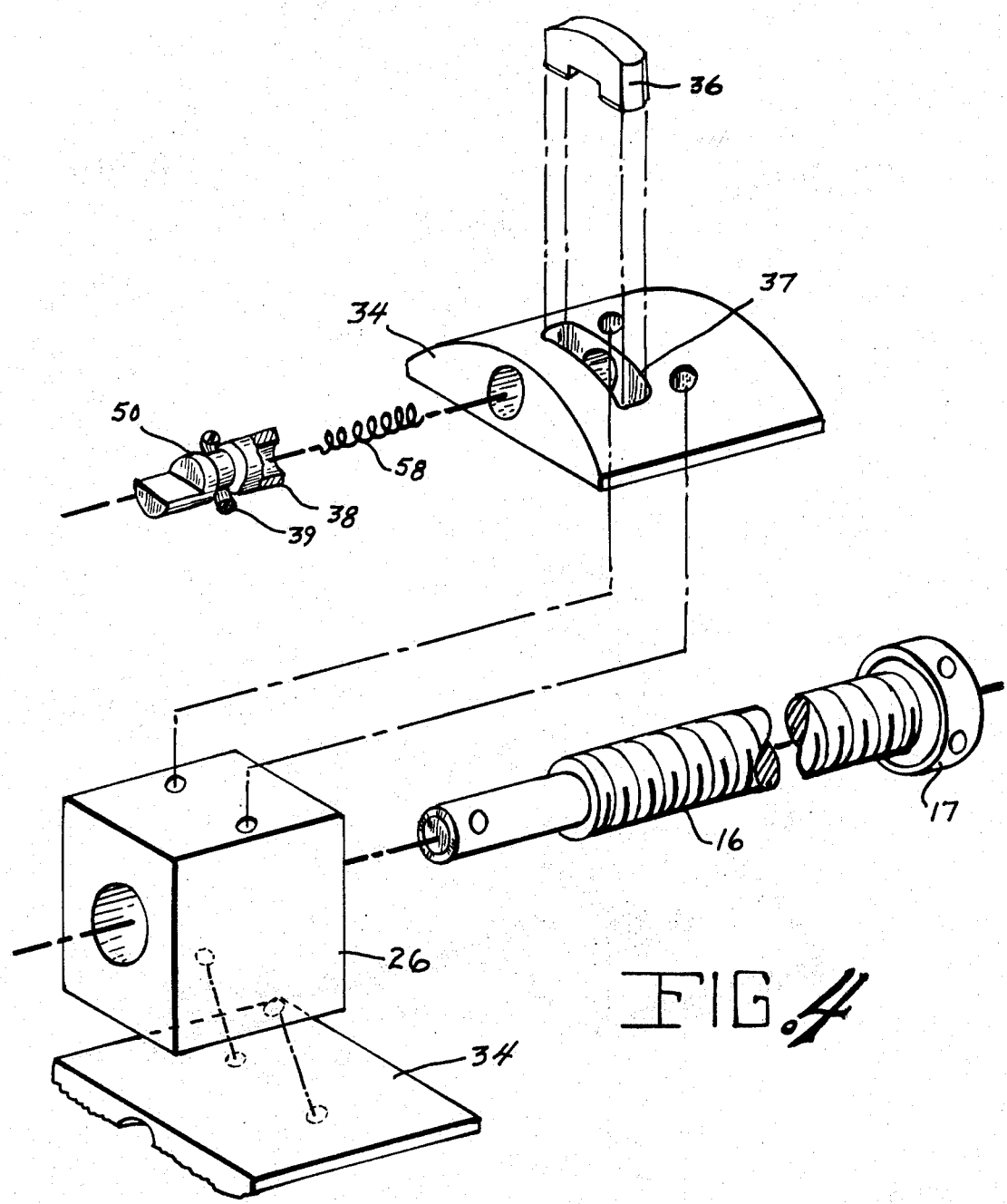

LOCK-AND RELEASE MECHANISM FOR PROPELLANT ACTUATED ESCAPE SYSTEM

BACKGROUND OF THE INVENTION

This is a continuation-in-part of application Ser. No. 152,841, filed June 14, 1971, now abandoned.

This invention relates generally to propellant actuated escape systems and more particularly to a lock and release mechanism for the canopy of jet aircraft.

Current models of high speed military aircraft are equipped with elaborate escape systems where the crew, in the event of mechanical malfunction, may safely separate themselves from the aircraft. These systems generally operate by first separating the canopy with an explosive charge, followed by the ejection of the crew member in his seat, again by an explosive charge.

One area of difficulty in these escape systems is in the canopy release system. Unlike the seat ejection mechanism which only operates in the event of an emergency, the canopy is raised and lowered for each flight and requires a combined conventional and emergency release system. In one particular canopy release system, the actuator-remover has a pin which holds the components together. This pin would, however, shear under a predetermined force e.g., an explosive charge. Experience has shown that repeated opening and closing of the aircraft canopy causes a shock load, from the canopy slamming against its sill, to be transmitted through the actuator remover and eventually shear the pin. To replace this pin, the entire actuator-remover has to be taken from the aircraft, disassembled and repaired at a great expense in both time and money.

An obvious remedy to this problem would be to increase the size of the pin or change in metallurgical makeup, however, this would require more force to release the canopy in an emergency which is an unacceptable alternative.

The invention disclosed herein provides for a novel linkage that allows the unit to have a shock absorbing feature, thereby reducing the load of closing shock and further a linkage that can be pretested before installation in an aircraft.

SUMMARY OF THE INVENTION

The invention solves the problem of accidental shear pin breakage caused by canopy closing shock. The novel device involves a tube to housing mechanism having a collapsible tang which reduces the effects of the canopy closing shock. The tang is biased by a spiral spring to normally maintain a connection between the tube and housing. Should the tang be collapsed by the tube sleeve upon canopy closing, a drive means, including a longitudinally translatable nut will advance the tang to its operative position.

It is therefore an object of the invention to provide a new and improved lock and release mechanism for propellant actuated escape systems.

It is another object of the invention to provide a new and improved lock and release mechanism for propellant actuated escape systems that eliminates accidental breakage of shear pin components.

It is a further object of the invention to provide a new and improved lock and release mechanism that may be readily substituted for prior art mechanisms.

It is still another object of the invention to provide a new and improved lock and release mechanism that reduces the load of closing shock on the closing mechanism.

It is still a further object of the invention to provide a new and improved lock and release mechanism that may be pretested before installation.

It is another object of the invention to provide a new and improved lock and release mechanism that substantially reduces the number of repairs over prior art devices.

It is another object of the invention to provide a new and improved lock and release mechanism for aircraft canopies that has a more perfect load tolerance limit than prior art devices.

It is another object of the invention to provide an improved lock and release mechanism which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings.

DESCRIPTION OF THE DRAWINGS

FIG. 1 is a side cross-sectional view of the invention.

FIG. 2 is a top view of the invention partly in section.

FIG. 3 is an enlarged view of the invention.

FIG. 4 is an exploded view of the invention.

DESCRIPTION OF PREFERRED EMBODIMENT

Referring now to FIGS. 1 and 2, the actuator remover is shown generally at 10 and consists of an outer tube or gear housing 12 which is secured through means not shown to the aircraft.

An inner tube 14 maintains a sliding fit within the outer tube 12. A ball bearing screw 16 extends the length of the inner and outer tubes and passes through a roller bearing 18 and terminates at the drive mechanism adapter 20. The bearing 18 is held in the main bearing housing 40 by the retainer 22 and screws 24. A ball nut 26 is mounted on the ball bearing screw 16 and is adapted to move along the ball bearing screw upon rotation of the screw. Mounted on the end of the inner tube 14, at plug 42, is an adapter 28 with a grease fitting 30 which mates with a fitting on the aircraft canopy. The ball nut 26 is connected to the inner tube 14 through the retainer tang 32, piston retainer 34 and two keys 36.

Since the invention is utilized for raising an aircraft canopy, the static force applied will tend to resist movement of the parts away from the position shown in the drawing (e.g. left to right). Hence, as the mechanism is activated, and the outer housing 12 being attached to the air frame by means not shown, the ball nut 26 is advanced against the static force by rotation of the screw 16. The screw is supported in bearing 18. The ball nut 26, connected to the retainer tang 32 through the key 36, moves along the thread as the screw is rotated. The inner housing 14 is moved with the ball nut 26 due to the engagement of the lip 31 of the retainer tang 32 with the inner housing 14. The inner housing has a plug 42 having an adapter 28 and bearing 38 which engages a mating attachment on the canopy.

In the event of excessive force being applied to the lock and release mechanism causing the fingers to move inwardly, the mere reversal of the direction of the ball bearing screw 16 and a slight turning thereof will cause the ball nut 26 to return to its proper position and similarly the tang fingers 54 to return to their proper position on the cam surfaces 35, hence securing the mechanism for operation.

FIG. 3 shows an enlarged view of the invention, and FIG. 4 shows an exploded view. The retainer tang 32 is held by the lip 31 butting against a mating surface 56 on the tube 14, and the keys 36. The key 36 fits into the retaining tang slot 37 and is held in position by the piston 50. The spring 58 positions the piston and maintains a bias force to restrain the movement of the piston. A pair of piston retainers 34 are mounted on opposite sides of the ball nut 26 and contain a recess for the spring 58 and an aperture 37 for the key 36. The tang assembly rides against the inner cam surface 35 of the tube 14 and the fingers 54 are biased against said surface by the action of the flat steel spring strip 60 coiled inside the fingers. Taking the figures collectively, the canopy load is transmitted through the bearing 38 at one end and the main bearing housing 40 at the other. The main bearing housing is ultimately connected to the outer tube or gear housing 12. The force is transmitted through the bearing 38 to the tube plug 42, through the inside tube 14 to the retainer tang 32. From the air frame, the load is transmitted through the gear box-outer tube 12 to the main bearing housing 40 through the screw 16 and ball nut 26 of the ball nut assembly. The force is applied from the ball nut assembly through the piston retainer 34 and through the key 36 to the slot 33 in the retainer tang 32.

When the load or force reaches a specified critical tensile value, the key 36 pulls the retainer tang 32 to the left as shown in the drawing and the inner tube 14 moves to the right. The tang fingers 54 begin to cam inwardly due to the constricting cam surfaces 35, formed on the inner surface of the tube 14. This motion squeezes the coiled spring inside the tang fingers 54 of the retainer tang 32. The surfaces of the steel spring 60 rub against each other because of their wrapped condition. The rubbing causes friction which converts the excessive energy into heat which is then dissipated. The motion is limited and the retainer tang 32 does not disengage from the inner surface of the tube 14. The action can be repeated without damaging any of the components of the mechanism. Thus, the invention acts in the manner of a shock absorber.

Under a compression load, as for example, when opening an aircraft canopy, the lip 31 on the retainer tang 32 abutts the mating face 56 of the inner tube 14. This causes the inside tube to move to the right which the ball nut assembly applies a force toward the right side of the drawing.

Under an emergency condition, when the canopy must be ejected, a propellant actuated device (not shown) supplies gas pressure. The gas enters the outer tube 12 between the main bearing housing 40 and the ball nut 26. The pressure of the gas forces the piston 50 with O-ring 39 against the spring 58 releasing the keys 36. A caming action occurs, due to the shape of the keys between the retainer tang 32 and the keys 36 thereby forcing the keys out of the slot and releasing the tang. The gas exerts additional force against the inner walls of the tube 14 causing it to move out and away from the outer tube 12 and further causing the release of the canopy.

In the event of failure of the aforementioned emergency system the retainer tang 32 is so designed and constructed that a constant load exceeding a preset designated load, as determined by the flat spring-positioned inside the fingers, will cause the tang to separate from the inner tube 14.

As an aircraft moves through the atmosphere, a lift force is exerted upon its entire upper surface. This lift force will raise the canopy when the canopy locks have been released. The load exerted as a result of this lifting force combined with the air rushing in under the canopy exceeds the tang and spring restraining force and the inside tube will slip away from the tang allowing the canopy to separate from the airframe.

It should be understood, of course, that the foregoing disclosure relates only to a preferred embodiment of the invention and that numerous modifications or alterations may be made therein without departing from the spirit and scope of the invention as set forth in the appended claims.

I claim:

1. A lock and release mechanism for propellant actuated escape systems comprising: a housing adapted to be secured to a fixed member; a cylindrically shaped member mounted within said housing and in sliding engagement therewith; means mounted at the end of the cylindrically shaped member for engaging a movable member; a screw threaded shaft journaled in said housing and extended through the housing and along the longitudinal of said cylindrically shaped member; means, located at one end of said shaft for causing the shaft to rotate; nut means engaging the screw thread and adapted to be translated along the length of said screw therad; means for releasably connecting said nut means and said cylindrically shaped member, and spring tang means engaging said cylindrically shaped member and the release means for causing the release means to operate upon a deflection of the tang means.

2. A lock and release mechanism for propellant actuated escape systems according to claim 1 including: a spring means engaging the tang means at one end thereof for absorbing shock upon operation of the mechanism.

* * * * *